United States Patent
Klinder et al.

(10) Patent No.: US 10,032,296 B2
(45) Date of Patent: Jul. 24, 2018

(54) VOLUMERTRIC IMAGE DATA VISUALIZATION

(71) Applicant: KONINKLIJKE PHILIPS N.V., Eindhoven (NL)

(72) Inventors: Tobias Klinder, Uelzen (DE); Cristian Lorenz, Hamburg (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 70 days.

(21) Appl. No.: 15/028,730

(22) PCT Filed: Oct. 9, 2014

(86) PCT No.: PCT/IB2014/065165
§ 371 (c)(1),
(2) Date: Apr. 12, 2016

(87) PCT Pub. No.: WO2015/063632
PCT Pub. Date: May 7, 2015

(65) Prior Publication Data
US 2016/0260231 A1 Sep. 8, 2016

Related U.S. Application Data (60) Provisional application No. 61/897,414, filed on Oct. 30, 2013.

(51) Int. Cl.
*G06K 9/00* (2006.01)
*G06T 11/00* (2006.01)
(Continued)

(52) U.S. Cl.
CPC .......... *G06T 11/008* (2013.01); *G06T 15/08* (2013.01); *G06T 19/00* (2013.01);
(Continued)

(58) Field of Classification Search
None
See application file for complete search history.

(56) References Cited

U.S. PATENT DOCUMENTS 6,483,506 B1 * 11/2002 Costabel ................. G06T 13/20
345/419
8,086,013 B2 12/2011 Wang
(Continued)

FOREIGN PATENT DOCUMENTS

JP 5-103793 4/1993
JP 6215153 8/1994
(Continued)

OTHER PUBLICATIONS

Klinder et al., "Automated model-based vertebra detection, identification, and segmentation in CT images," Medical Image Analysis 13(3), 471-482 (2009).
(Continued)

*Primary Examiner* — Hadi Akhavannik (57) ABSTRACT

A method includes obtaining first image data that includes voxel representing a structure of interest. The structure of interest includes a plurality of different sub-structures. The method further includes segmenting a volume of the first image data that includes only a single sub-structure for each of the plurality of different sub-structures. The method further includes creating a different local coordinate system for each of the different sub-structures for each of the volumes. The method further includes visually presenting the structure of interest through separate visual presentations of sets of reformatted images for each of the individual plurality of different sub-structures. A set of reformatted images for a sub-structure includes different cut planes generated from a corresponding segmented volume of the segmented volumes and the local coordinate system for the sub-structure.

20 Claims, 6 Drawing Sheets

(51) Int. Cl.
    *G06T 19/00*         (2011.01)
    *G06T 15/08*         (2011.01)

(52) U.S. Cl.
    CPC ............... *G06T 2207/10081* (2013.01); *G06T 2207/30012* (2013.01); *G06T 2210/41* (2013.01); *G06T 2215/16* (2013.01); *G06T 2219/008* (2013.01)

(56) References Cited

U.S. PATENT DOCUMENTS

| | | | |
|---|---|---|---|
| 8,423,124 | B2 | 4/2013 | Kiraly |
| 2002/0061126 | A1 | 5/2002 | Gerard |
| 2006/0093199 | A1* | 5/2006 | Fram ............... A61B 6/5223 382/128 |
| 2006/0110017 | A1 | 5/2006 | Tsai |
| 2008/0287796 | A1* | 11/2008 | Kiraly ............... A61B 5/103 600/443 |
| 2009/0262998 | A1* | 10/2009 | Wang ............... G06F 19/321 382/131 |
| 2010/0086185 | A1* | 4/2010 | Weiss ............... B60R 25/00 382/131 |
| 2011/0130653 | A1 | 6/2011 | Wang |
| 2011/0228995 | A1* | 9/2011 | Batman ............... G06T 19/00 382/128 |
| 2012/0053454 | A1 | 3/2012 | Wang |

FOREIGN PATENT DOCUMENTS

| | | |
|---|---|---|
| JP | 8-131403 | 5/1996 |
| JP | 2008132019 | 6/2008 |
| JP | 2012045255 | 3/2012 |

OTHER PUBLICATIONS

Chris A Cocosco et al: "Java Internet Viewer: A WWW Tool for Remote 3D Medical Image Data Visualization and Comparison" In: "Lecture Notes in Computer Science", Jan. 1, 2001 (Jan. 1, 2001), Springer Berlin Heidelberg, Berlin, Heidelberg, XP055196499.

Jackie A Clowes et al: "Chapter 36. Vertebral Fracture Assessment" In: "Primer on the Metabolic Bone Diseases and Disorders of Mineral Metabolism", Dec. 22, 2009 (Dec. 22, 2009), Wiley, US, XP055195552.

Tomaz Vrtovec et al: "Automated generation of curved planar reformations from MR images of the spine; Automated generation of CPRs from MR images of the spine", Physics in Medicine and Biology, Institute of Physics Publishing, Bristol GB, vol. 52, No. 10, May 21, 2007.

Yao, et al., "Automated Spinal Column Extraction and Partitioning", Biomedical Imaging: Nano to Macro, 2006. 3rd IEEE International Symposium on.

* cited by examiner

VOLUMERTRIC IMAGE DATA VISUALIZATION

CROSS REFERENCE TO RELATED APPLICATIONS

This application is the U.S. National Phase application under 35 U.S.C. § 371 of International Application No. PCT/IB2014/065165, filed Oct. 9, 2014, published as WO 2015/063632 on May 7, 2015, which claims the benefit of U.S. Provisional Patent Application No. 61/897,414 filed Oct. 30, 2013. These applications are hereby incorporated by reference herein.

The following generally relates to volumetric image data visualization and is described with particular application to computed tomography (CT). However, the following is also amenable to other imaging modalities.

A CT scanner generally includes an x-ray tube mounted on a rotatable gantry opposite a detector array across an examination region. The rotatable gantry and hence the x-ray tube rotate around the examination region. The x-ray tube is configured to emit radiation that traverses the examination region and is detected by the detector array. The detector array, in response, generates and outputs a signal indicative of the detected radiation. The signal is reconstructed to generate three-dimensional (3D) volumetric image data, which can be processed to generate one or more images of structure of interest. Efficient visualization of the image data is crucial to support diagnosis and to save reading time.

For example, the spine consists of twenty-four (24) pre-sacral vertebrae. For some applications, the vertebrae are inspected individually, e.g., for osteoporosis or spine metastases. In contrast to other applications, the spine is usually not inspected in axial images, but in sagittal reformats. However, curvatures of the spine due to pathologies, e.g., scoliosis or kyphosis, can be present which impede efficient inspection in three-dimensional reformats. Furthermore, due to the amount of objects present in the image the inspection for whole body scans can be time-consuming. If the vertebrae are not carefully inspected, diseases might be overlooked easily, as e.g., spine metastases or small fractures. For follow-up analysis, the problem may become more severe as there are more images.

Figure 1:
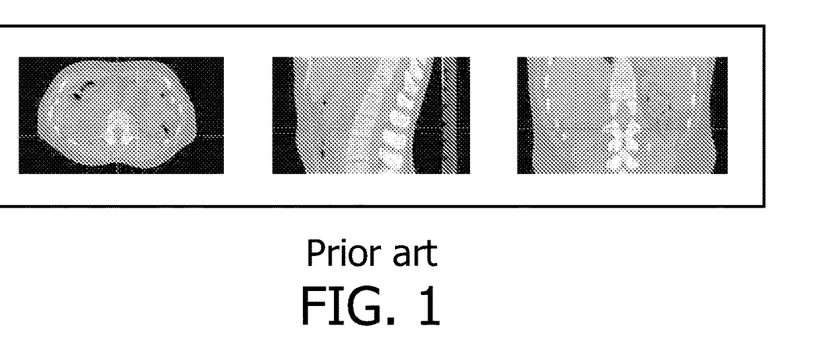
FIG. 1 illustrates a display of three CT images (an axial image, a sagittal image, and a coronal image) of the spine
Figure 2:
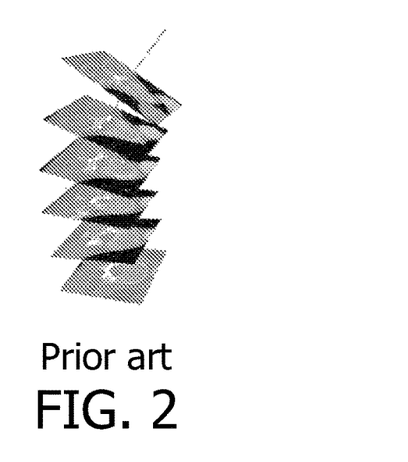
FIG. 2 illustrates segmented slices of the spine, segmented through a prior art slice segmentation algorithm.
Figure 3:
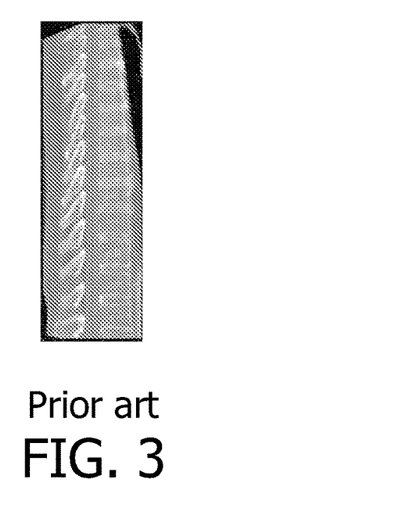
FIG. 3 illustrates a straightened spine image, straightened through a prior art reformatting algorithm.

Visualization schemes for the spine have included curved planar reformation (CPR). With CPR, the spinal cord is first segmented and then reformatted, resulting in a straightened spine image that is invariant of rotations. This is shown in FIGS. 1, 2 and 3. FIG. 1 shows a display with original axial, sagittal, and coronal CT images of a spine from an image data set, FIG. 2 shows segmented slices of the spine from the image data set, and FIG. 3 shows a straightened spine image from the slices using CPR. Unfortunately, for strong spine bending or a large extend around the spinal cord, the slices stacked up to build the CPR image intersect and, thus, there is no one-to-one mapping between the CPR image and the original image. Thus, a position marked in the CPR cannot be readily mapped back to the image data, thus limiting the value for diagnosis.

Aspects described herein address the above-referenced problems and others.

The following describes an approach for efficient and standardized visualization. In one instance, this includes segmenting individual sub-structures of a structure of interest using a segmentation that provides a sub-structure specific coordinate system for each sub-structure. Then, for each individual sub-structure, a set of cut planes is visually presented using the local coordinate system of the sub-structure. Optionally, a three-dimensional rendering is visually presented. For comparative studies, a same segmented sub-structure from image data of different scans is concurrently visually presented using the local coordinate system.

In one aspect, a method includes obtaining first image data that includes voxel representing a structure of interest. The structure of interest includes a plurality of different sub-structures. The method further includes segmenting a volume of the first image data that includes only a single sub-structure for each of the plurality of different sub-structures. The method further includes creating a different local coordinate system for each of the different sub-structures for each of the volumes. The method further includes visually presenting the structure of interest through separate visual presentations of sets of reformatted images for each of the individual plurality of different sub-structures. A set of reformatted images for a sub-structure includes different cut planes generated from a corresponding segmented volume of the segmented volumes and the local coordinate system for the sub-structure.

In another aspect, a computing system includes a computer readable storage medium encoded with instructions for visualizing image data, wherein the image data includes voxels that represent a structure of interest that includes a plurality of different sub-structures. The computing system further includes a processor, which, in response to executing the instructions, processes the image data, thereby segmenting the individual sub-structures, creating a different local coordinate system for each of the individual sub-structures, and separately visually presenting images of the individual sub-structures based on different local coordinate systems.

In another aspect, a computer readable storage medium is encoded with computer readable instructions, which, when executed by a processer, cause the processor to: visually present a structure of interest through separate visual presentations of sets of reformatted images for each of a plurality of different sub-structures of the structure of interest, wherein a set of reformatted images for a sub-structure includes different cut planes generated from a corresponding segmented volume and a coordinate system local to the sub-structure The invention may take form in various components and arrangements of components, and in various steps and arrangements of steps. The drawings are only for purposes of illustrating the preferred embodiments and are not to be construed as limiting the invention.

Figure 4:
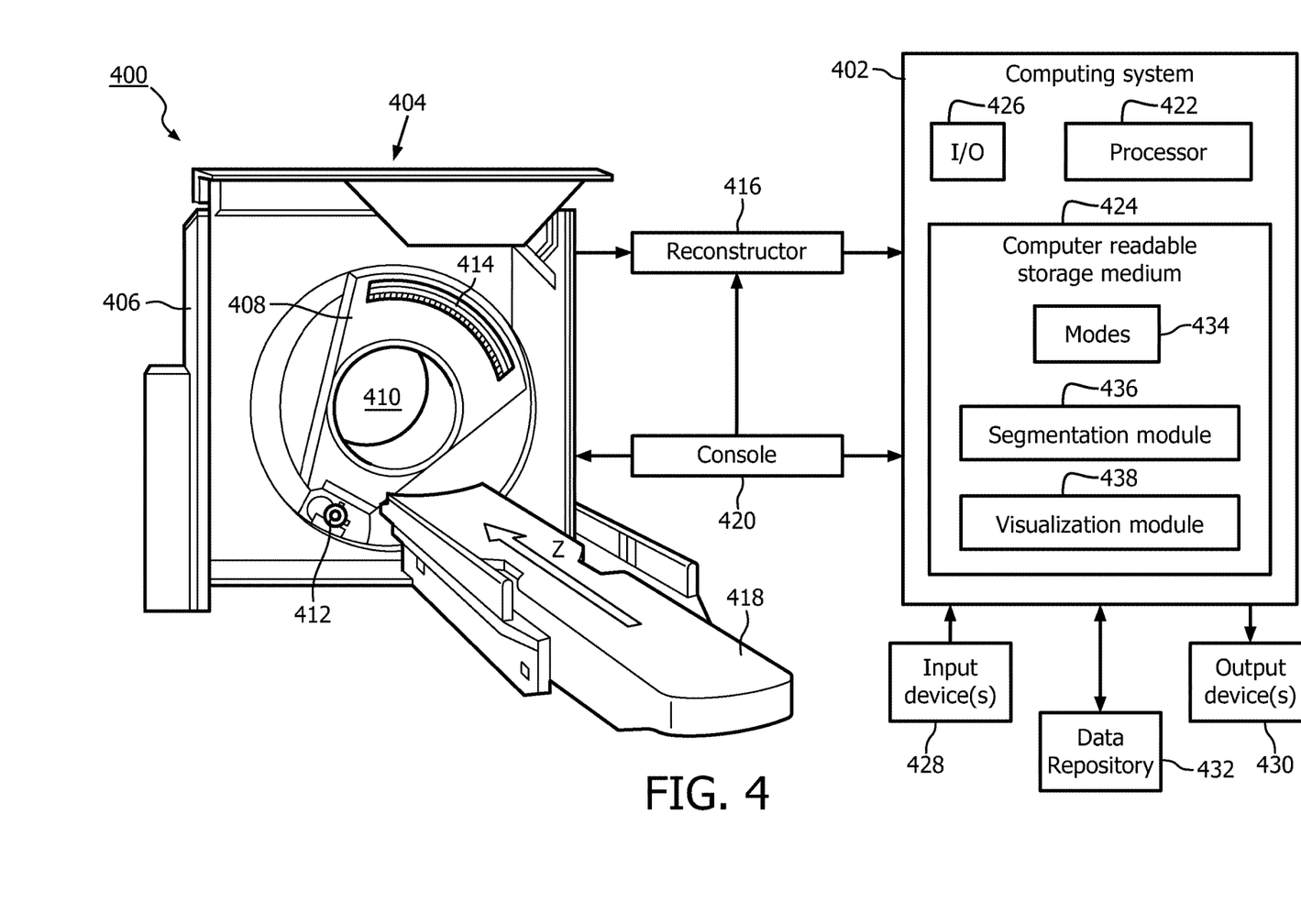
FIG. 4 schematically illustrates a computing system with a processor and memory encoded with instructions for efficient visualization of image data.

Initially referring to FIG. 4, a system 400 including a computing system 402 and an imaging system 404 is illustrated. In a variation, the imaging system 404 can be omitted. In the variation, the image data processed by the computing system 402 can be obtained from an image storage device, which may be part of the computing system 402, remotely located with respect to the computing system 402 (e.g., hardware memory thereof used therewith), or distributed between the computing system 402 and a remote location.

In the illustrated embodiment, the imaging system 404 includes a computed tomography (CT) scanner. The CT scanner 404 includes a generally stationary gantry 406 and a rotating gantry 408, which is rotatably supported by the stationary gantry 406. The rotating gantry 408 rotates around an examination region 410 about a longitudinal or z-axis. A radiation source 412, such as an x-ray tube, is supported by the rotating gantry 408 and emits a radiation beam. A radiation sensitive detector array 414 detects radiation that traverses the examination region 410 and generates projection data.

A reconstructor 416 reconstructs the projection data and generates volumetric image data. A subject support 418 such as a couch supports a subject or an object in the examination region 410. A computer serves as an operator console 420 and includes a human readable output device such as a monitor and an input device such as a keyboard, mouse, etc. Software resident on the console 420 allows the operator to interact with the CT scanner 404 via a graphical user interface (GUI) or otherwise.

The computing system 402 processes volumetric image data. In one instance, the computing system 402 processes volumetric image data processes image data generated by the imaging system 404. In another instance, the computing system 402 processes volumetric image data processes image data generated by a different imaging system. In either instance, the image data, which is in electronic format, is obtained from the imaging system and/or from computer storage of another device.

The illustrated computing system 402 includes one or more hardware processors 422 (e.g., a central processing unit (CPU), a micro-processor (μ-processor), a controller, etc.) and computer readable storage medium 424 (which excludes transitory medium) such as physical memory encoded or embedded with computer readable instructions. The instructions, when executed by the one or more processors 422 cause the one or more processors 422 to carry out functions, such as one or more functions described herein and/or other functions.

Additionally or alternatively, the one or more processors 422 execute instructions carried by transitory medium such as a signal or carrier wave. The computer readable storage medium 424 is shown as a single element. However, it is to be appreciated that the computer readable storage medium 424 may include a plurality of separate hardware storage devices. The separate hardware storage devices include hardware storage devices local to the computing system 402 and/or hardware storage devices external from the computing system 402.

Input/output (I/O) 426 receives information from one or more input devices 428 (e.g., a keyboard, a mouse, and the like) and/or conveys information to one or more output devices 430 (e.g., a display monitor, a printer, etc.). The I/O 426 is also configured to exchange data (in electronic format) with one or more data repositories 432. Examples of data repositories 432 include a picture archiving and communication system (PACS), a radiology information system (RIS), a hospital information system (HIS), an electronic medical record (EMR), a database, a server, an imaging system, and/or other data repository.

The illustrated computer readable storage medium 424 stores software applications, software modules, and/or data. In the illustrated example, the computer readable storage medium 424 at least stores instructions for different visualization modes of operation, a segmentation module 436 configured to segment sub-structures of a structure of interests into individual sub-structures and provide a local coordinate system for each sub-structure, and a visualization module 438 that reformats, based on the mode, the segmented individual sub-structures for visual display.

The display of the individual sub-structures is well-suited for applications in which a clinician is interested in inspecting the individual sub-structures separately, and not the entire structure of interest (all the sub-structures) in aggregate. An example is an inspection of the spine, for example, to rule out and/or identify vertebrae fractures, metastase. With such an inspection, the clinician does not look at the overall spine curve, but rather inspects the individual vertebrae. In this example, "breaking up" the overall constellation of the spine does not result in a loss of information, but rather allows for an efficient visualization for each vertebra individually.

Figure 5:
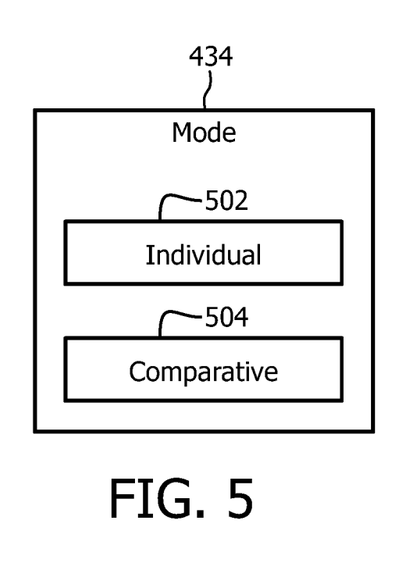
FIG. 5 illustrates an example of available modes of operation for the visualization.
Figure 6:
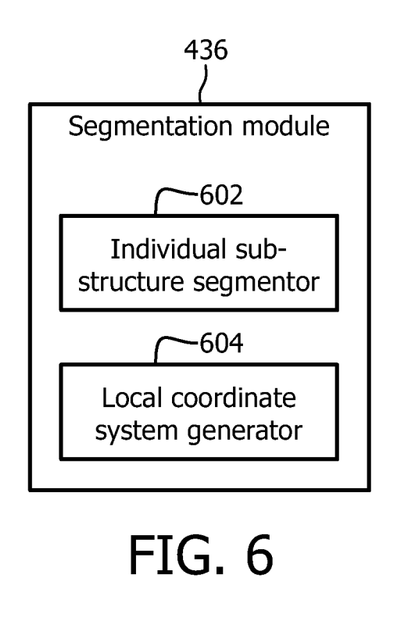
FIG. 6 illustrates an example of a segmentation module of the visualization.
Figure 7:
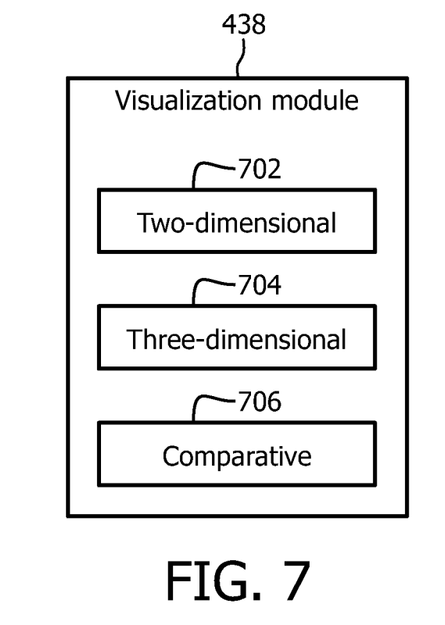
FIG. 7 illustrates an example of a visualization module of the visualization.

FIGS. 5, 6 and 7 respectively illustrate an example of the modes 434, the segmentation module 436, and the visualization module 438, in connection with processing image data for visualization.

In FIG. 5, the modes 434 include at least an individual mode 502 of operation and a comparative mode 504 of operation. The individual mode 502 indicates that segmented individual sub-structures are going to be the visually presented separately. The comparative mode 504 indicates that segmented individual sub-structures from image data is going to the visualized concurrently with corresponding segmented individual sub-structures from different image data. This can be utilized to determine whether a state of a sub-structure has changed between two scans acquired at different times, e.g., an initial scan and a post-treatment scan.

The particular mode utilized can be variously selected. For example, in one instance, the computing system 402, via a display of the output device(s) 430, visually presents graphical indicia, which, when actuated by an input device of the input device(s) 428 such a mouse click, identifies the mode. Where the display includes a touchscreen or touch sensitive area, a physical device or structure can actuate indicia. The graphical indicia can be in a list, a drop down menu, etc., with first sub-indicia for selecting the individual mode 502 and second sub-indicia for selecting the comparative mode 504.

In another instance, the operator identifies the mode by entering a command, via a keyboard of the input device(s) 428, through a command line prompt. In yet another instance, the processor 422 reads a portion of the image data file, such a header, which includes data that identifies the image data as from a subsequent scan such as a follow up scan. In still another instance, the processor 422 searches the one or more data repositories 432 for image data from another scan of the same subject that includes data representing the same sub-structures. If a match is found, the computing system 402 may display a message asking whether comparative mode 504 should be utilized.

In FIG. 6, the segmentation module 436 includes an individual sub-structure segmentor 602 and a local coordinate system generator 604. The individual sub-structure segmentor 602 segments the individual sub-structures including separating of the sub-structure from other or background structure. The local coordinate system generator 604 determines the local sub-structure specific coordinate system for each of the segmented sub-structures.

The segmentation module 436 and the local coordinate system generator 604, together, segment the individual sub-structures and provides a sub-structure specific coordinate system. The coordinate system allows for efficient reformatting in a sub-structure intrinsic coordinate system, which provides one-to-one correspondence to the original image data, without overlapping sub-structures, unlike curved planar reformation (CPR) and/or other approaches. Other segmentation approaches are also contemplated herein.

An example segmentation is described in Klinder et al., "Automated model-based vertebra detection, identification, and segmentation in CT images," Medical Image Analysis 13(3), 471-482 (2009). In individual mode 502, a coordinate system is particular to a single sub-structure. In comparative mode 504, a same coordinate system is used for a sub-structure segmented from different image data. This allows for visualizing the sub-structures of two scans in a same local coordinate system.

In FIG. 7, the visualization module 438 includes a two-dimensional (2D) 702 visualization, a three-dimensional (3D) 704 visualization, and a comparative 706 visualization. The two-dimensional 702 visualization reformats and visually presents the segmented individual sub-structures using one or more a predetermined cut planes, such as an object specific oblique cut plane, an axial cut plane, a coronal cut plane, and/or a sagittal cut plane, each cut in the corresponding sub-structure specific coordinate system, e.g., through the origin.

The three-dimensional (3D) 704 visualization applies three-dimensional or volume rendering approaches. For instance, the sub-structures can be reformatted using a minimum intensity projection (mIP) which projects, in the visualization plane, voxels with the minimum intensity that intersect parallel rays traced from the viewpoint to the plane of projection. Other volume renderings, including maximum intensity projection (MIP) and/or other volume renderings can also be used.

The comparative 706 visualization concurrently displays segmented sub-structures from multiple scans performed at different times. For example, a first set of segmented sub-structures can be from an initial or treatment planning scan, a second set of segmented sub-structures, which are the same sub-structures as the first set of segmented sub-structure, can be from one or more post treatment scans. The segmented sub-structures from the different scans are synchronized in that a particular sub-structure in the two scans has a same coordinate system.

The following provides a particular example in which the structure of interest is the spine and the sub-structures are the individual vertebrae.

In this example, the individual sub-structure segmentor 602 of the segmentation module 436 segments volumes that include the individual vertebrae of the spine from the image data of the spine. This includes removing at least a sub-portion of surrounding non-vertebrae structure. The local coordinate system generator 604 create a local coordinate system for each of the segmented vertebrae. The two-dimensional 702 visualization reformats and visually presents the segmented individual vertebrae, including producing a set of images for each vertebrae that includes an object specific oblique cut plane, an axial, a sagittal and a coronal image, with each image of each set based on the local coordinate system.

Figure 8:
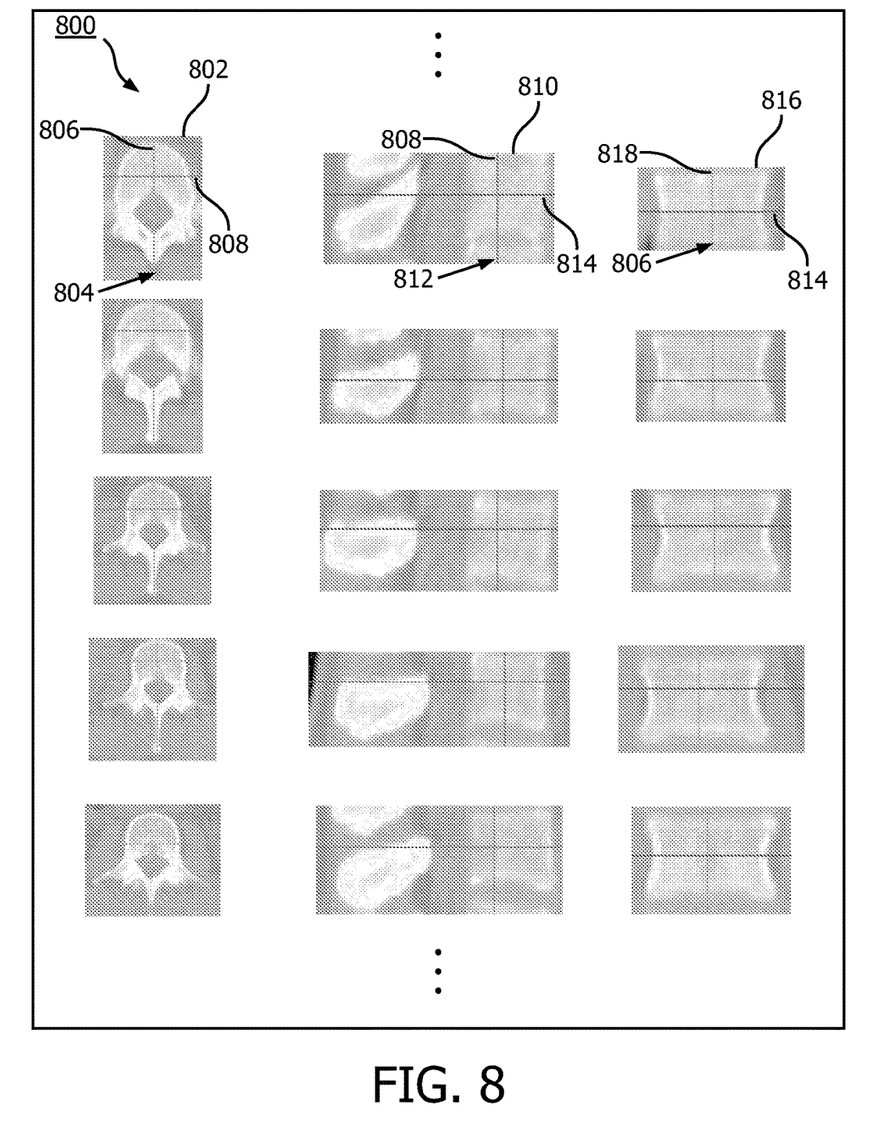
FIG. 8 illustrates an example display of an entire sub-portion of interest of the spine through visualization of sets of images for each individual vertebra of interest where a local coordinate system is used for each set of images.

FIG. 8 illustrates an example display of the set of images for individual mode 502. In FIG. 8, each row represents a different vertebrae (e.g., . . . T11, T12, L1, L2, L3, . . . ) and each column represents a different object specific oblique cut plane. Other suitable cut planes include axial, sagittal and coronal views. In FIG. 8, each set of images also includes reference crosshairs, which are based on the local coordinate system, with each image. In each row, the individual images are linked through the local coordinate system, and the sets of images, in aggregate, provide overview of the whole spine, on an individual vertebra basis.

For example, in FIG. 8, a first set of images 800 has a first oblique image 802 with a crosshair 804 that includes a first line 806 that indicates a first oblique plane and a second line 808 that indicates a second oblique plane. A second oblique image 810 corresponds to the first oblique plane indicated by the first line 806. The second oblique image 810 has a crosshair 812 that includes the second line 808 and a third line 814 that indicates a third oblique plane of the first oblique image 802. A third oblique image 816 corresponds to the second oblique plane indicated by the first line 806. The third oblique image 816 has a crosshair 818 that includes the first line 806 and the third line 814.

Scrolling through the volume of any one of the three images of a set automatically moves the crosshairs in the other two of the three images based on the local coordinate system. This links the three images together and provides a visual spatial frame of reference for the operator. Such scrolling can be through dedicated up/down buttons on a keyboard of the input device(s) 428, "grabbing" and moving a line via a mouse of the input device(s) 428, turning a scroll wheel of a mouse of the input device(s) 428, etc. Clicking on any of the reformatted images, in one instance, displays one or more of the original images that correspond to the reformatted images.

FIG. 8 shows object specific oblique cut planes. Other orientations, such as axial, sagittal, coronal and/or other views are also contemplated herein. Furthermore, and as described herein, a three-dimensional volume, such as a mIP rendering, may alternatively or additionally be shown. The mIP rendering may be along pre-defined axes, for example, well-suited to show osteolytic lesions, or otherwise located. The particular images may vary from vertebra to vertebra.

FIG. 8 shows a set of images for at least five (5) vertebrae. The particular vertebrae shown may be based on a preprogrammed default, the vertebrae covered in the image data (e.g., all the vertebrae in the image data), vertebrae designated as vertebrae of interest (e.g., via a use selectable field, information in the header file, etc.), a running software application, vertebrae selected/deselected via an on-screen list of available vertebrae, cuts that show the processi, and/or otherwise. Likewise, the particular images shown for a particular vertebra can be selected. Anatomical labels (e.g., T11, oblique, etc.) can be overlaid to further assist visualization.

Figure 9:
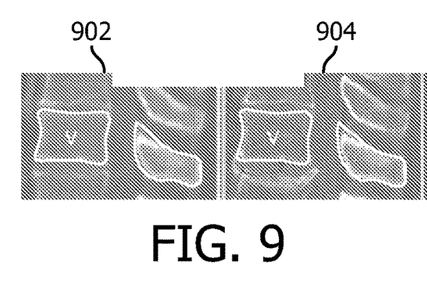
FIG. 9 illustrates an example comparative display of a vertebra of interest through visualization of an individual vertebra from two different image data sets based on a rendering using a same local coordinate system, where there is no change in vertebra state.
Figure 10:
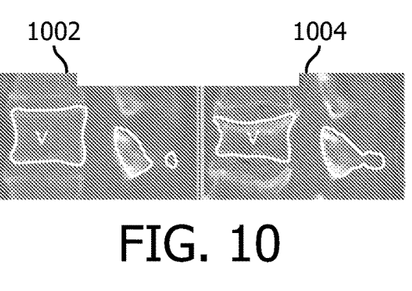
FIG. 10 illustrates an example comparative display of a vertebra of interest through visualization of an individual vertebra from two different image data sets based on a rendering using a same local coordinate system, where there is a change in vertebra state.

FIGS. 9 and 10 each shows example image display for comparative mode 504. FIG. 9 shows two images, an image 902 and an image 904. The image 904 was acquired at a later time, but was generated using the same local coordinate system used to generate the image 902. These images show no change for a vertebra "V". FIG. 10 shows two images, an image 1002 and an image 1004. The image 1004 was acquired at a later time, but was generated using the same local coordinate system used to generate the image 1002. These images show a change for a vertebra "V".

Figure 11:
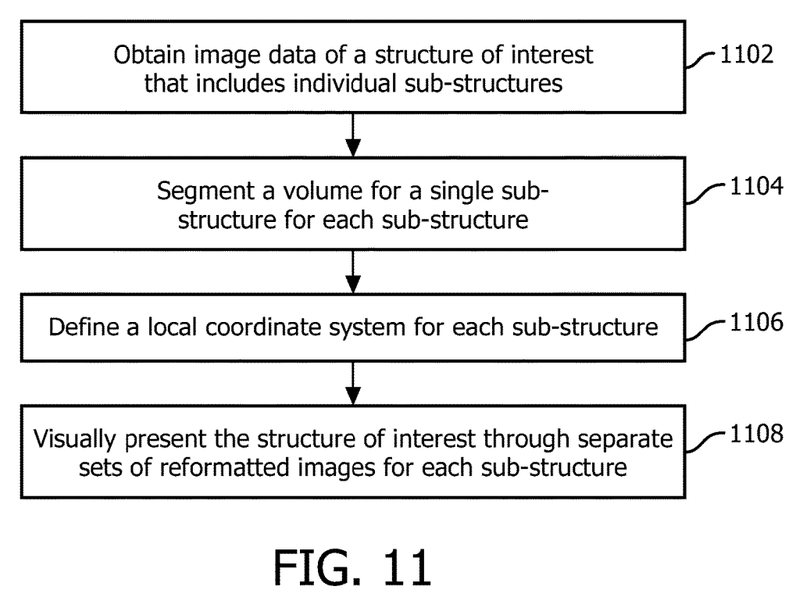
FIG. 11 illustrates an example method of visualization of a structure of interest through separate visualization of individual sub-structures of the structure of interest.

FIG. 11 illustrates an example method of visualization of a structure of interest through separate visualization of individual sub-structures of the structure of interest.

It is to be appreciated that the ordering of the acts of these methods is not limiting. As such, other orderings are contemplated herein. In addition, one or more acts may be omitted and/or one or more additional acts may be included.

At 1102, image data with voxels representing a structure of interest, which includes a plurality of sub-structures of interest, is obtained.

As discussed herein, an example of the structure of interest is a structure of interest which is curved such that individual sub-structures intersect in individual slices or images of the image data. One such structure is the spine, which includes vertebrae sub-structures.

At 1104, a volume including a single sub-structure is segmented for each sub-structure.

At 1106, a local coordinate system is defined for each sub-structure of each volume.

At 1108, the structure of interest is visually presented through separate visual presentation of separate sets of reformatted images for each of the individual sub-structures.

As discussed herein, the presentation of an individual sub-structure is, in instance, through a plurality of different cut plane images linked together through the local coordinate of the sub-structure. Additionally or alternatively, one or more three-dimensional volume renderings can also be visually presented.

Figure 12:
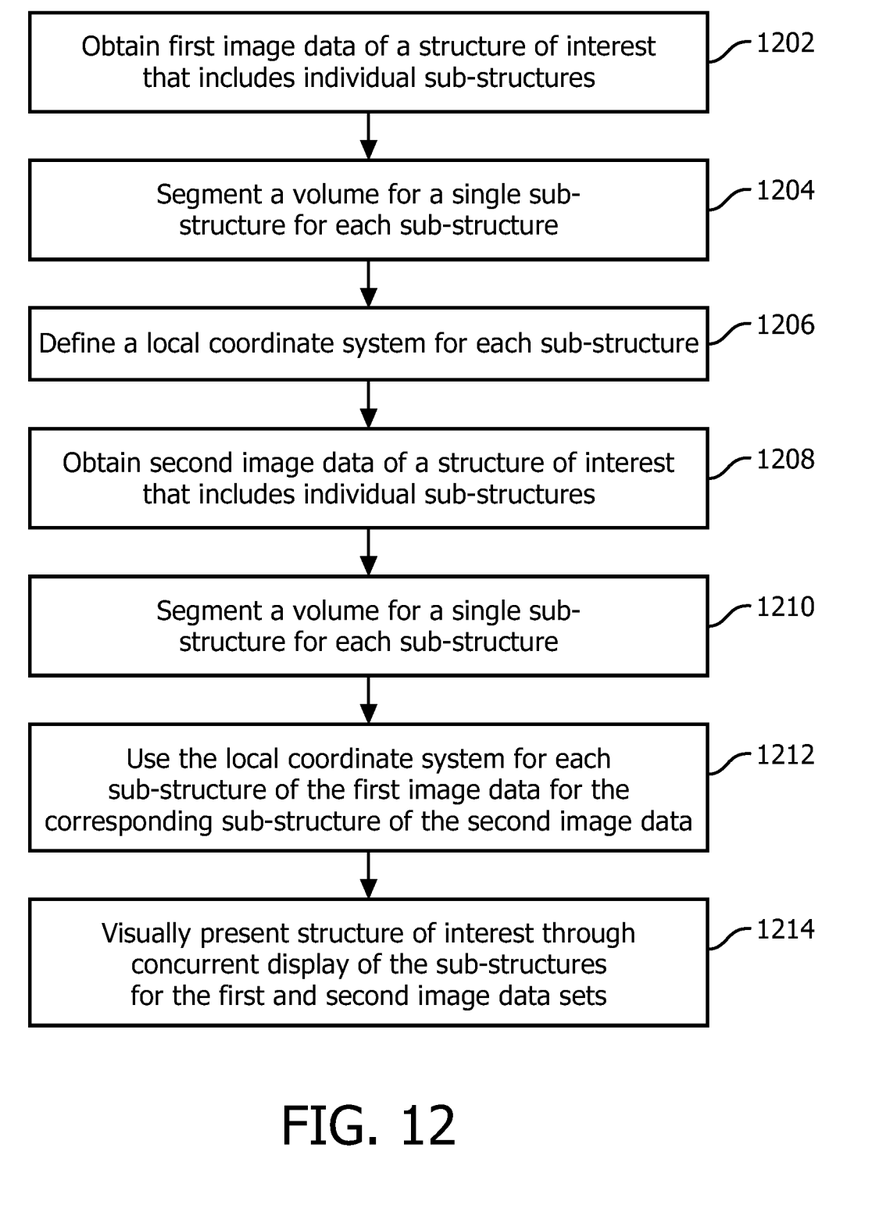
FIG. 12 illustrates an example method of comparative visualization of sub-structures of a structure of interest through separate comparative visualizations of individual sub-structures from two different image data sets using local coordinate systems.

FIG. 12 illustrates an example method of comparative visualization of sub-structures of a structure of interest from two different image data sets through separate comparative visualizations of individual sub-structures using local coordinate systems.

At 1202, first image data with voxels representing a structure of interest, which includes a plurality of sub-structures of interest, is obtained.

At 1204, a first volume including a single sub-structure is segmented for each sub-structure of the first image data.

At 1206, a local coordinate system is defined for each sub-structure of each first volume.

At 1208, second image data with voxels representing the structure of interest, which includes the plurality of sub-structures of interest, is obtained.

At 1210, a second volume including a single sub-structure is segmented for each sub-structure of the second image data.

At 1212, a second local coordinate system is defined for each sub-structure of each second volume, wherein a sub-structure of a second volume corresponding to a same structure of a first volume uses the same local coordinate system of the same structure of the first volume.

At 1214, the structure of interest is visually presented through concurrently displaying images of the sub-structures for the first and second volumes.

The above may be implemented by way of computer readable instructions, encoded or embedded on computer readable storage medium (which excludes transitory medium), which, when executed by a computer processor (s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
obtaining first image data that includes voxel representing a structure of interest, wherein the structure of interest includes a plurality of different sub-structures;
segmenting a volume of the first image data that includes only a single sub-structure for each of the plurality of different sub-structures;
creating a different local coordinate system for each of the different sub-structures for each of the volumes; and
visually presenting the structure of interest through separate visual presentations of sets of reformatted images for each of the individual plurality of different sub-structures,
wherein a set of reformatted images for a sub-structure includes different cut planes generated from a corresponding segmented volume of the segmented volumes and the local coordinate system for the sub-structure.

2. The method of claim 1, wherein the structure of interest includes a curved structure in which individual sub-structures intersect in at least one plane of the first image data overlap.

3. The method of claim 1, wherein the structure of interest includes the spine and the sub-structures include the individual vertebrae of the spine.

4. The method of claim 1, wherein the set of reformatted images includes one or more of an axial image, a sagittal image, a coronal image or an oblique image visually presented using the same local coordinate system.

5. The method of claim 4, further comprising:
visually presenting the structure of interest through one or more three dimensional volume renderings.

6. The method of claim 4, further comprising:
overlaying graphical indicia over each image of each set of reformatted images for each visually presented sub-structure, wherein the graphical indicia for each image in a set of reformatted images visually indicates the local coordinate system for the sub-structure represented by the set of images.

7. The method of claim 6, wherein the graphical indicia includes crosshair with individual lines that indicate one or more of an axial plane, a sagittal plane, or a coronal plane, or an arbitrarily plane.

8. The method of claim 4, further comprising:
receiving a first input indicating a current position of interest within a sub-structure, wherein the images of a set of reformatted images visually present different cut planes corresponding to the current position of interest.

9. The method of claim 8, further comprising:
receiving a second input indicating a new position of interest within the sub-structure; and
updating the visual presentation so that the images of the set of reformatted images visually present different cut planes corresponding to the new position of interest.

10. The method of claim 1, further comprising:
receiving a signal identifying a sub-set of the sub-structures to visually present; and
visually presenting only the sub-set of the sub-structures.

11. The method of claim 1, further comprising:
receiving a signal that transitions presentation of a sub-structure from at least one of off to on or on to off.

12. The method of claim 1, further comprising:
obtaining second image data that includes voxel representing the structure of interest;
segmenting a volume of the second image data that includes only the single sub-structure for each of the plurality of different sub-structures;
using the local coordinate systems created for the segmented sub-structures from the first image data for corresponding sub-structures segmented from the second image data; and
concurrently presenting corresponding sub-structures segmented from the first and second image data using the local coordinate system for the sub-structure.

13. A computing system, comprising:
a computer readable storage medium encoded with instructions for visualizing image data, wherein the image data includes voxels that represent a structure of interest that includes a plurality of different sub-structures; and
a processor, which is configured to, in response to executing the instructions, processes image data of a single subject, which includes segmenting individual sub-structures of the plurality of different sub-structures, creating a different local coordinate system for each of the individual sub-structures, and concurrently visually presenting separate images of the individual sub-structures based on the different local coordinate systems.

14. The computing system of claim 13, wherein the processor is configured to, in response to executing the instructions, generates a set of reformatted images for each of the sub-structures and separately visually presents the set of reformatted images of the individual sub-structures based on the local different local coordinate systems.

15. The computing system of claim 14, wherein the set of reformatted images includes one or more of an axial image, a sagittal image, a coronal image, or an oblique image.

16. The computing system of claim 14, wherein the processor, in response to executing the instructions, generates a volume rendering for at least one of the sub-structures and visually presents the volume rendering.

17. The computing system of claim 14, wherein the processor is configured to, in response to executing the instructions, superimposes a representation of the local coordinate system over the images of the set of images for each of the sub-structures.

18. The computing system of claim 17, wherein the representation includes lines that represent one or more of an axial plane, a sagittal plane, a coronal plane or an oblique plane.

19. The computing system of claim 13, wherein the processor is configured to, in response to executing the instructions, processes subsequently acquired image data, thereby segmenting individual sub-structures of the subsequently acquired image data, applying the different local coordinate system to the individual sub-structures segmented from the subsequently acquired image data, and concurrently visually presenting images of the individual sub-structures from the image data and the subsequently acquired image data using the same different local coordinate system.

20. A computer readable storage medium encoded with computer readable instructions, which, when executed by a processor, cause the processor to:
visually present a structure of interest through separate visual presentations of sets of reformatted images for each of a plurality of different sub-structures of the structure of interest, wherein a set of reformatted images for a sub-structure includes different cut planes generated from a corresponding segmented volume and a coordinate system local to the sub-structure.

* * * * *